United States Patent [19]
Glenn

[11] 3,805,475
[45] Apr. 23, 1974

[54] APPARATUS FOR STORAGE OF INTERACTANTS AND METHOD THEREOF

[76] Inventor: William G. Glenn, 190 N. Sandpiper, P.O. Box 1122, Ingleside, Tex. 78362

[22] Filed: Mar. 12, 1971

[21] Appl. No.: 123,728

[52] U.S. Cl. ................................................. 53/25
[51] Int. Cl. .................................................. B65b 3/04
[58] Field of Search ............... 53/25, 36, 235, 266; 252/316, 188.3, 381; 356/208; 23/230 B, 254 R, 259; 424/7, 12; 55/387, 421; 206/84

[56] References Cited
UNITED STATES PATENTS

| | | | |
|---|---|---|---|
| 462,109 | 10/1891 | Clotworthy | 252/188.3 X |
| 1,509,916 | 9/1924 | Waite | 206/84 X |
| 2,487,077 | 11/1949 | Shepherd | 23/254 R X |
| 2,982,396 | 5/1961 | Shihadeh | 206/84 |
| 3,036,894 | 5/1962 | Forestiere | 23/230 B |
| 3,334,018 | 8/1967 | Smythe | 424/7 X |
| 3,519,250 | 7/1970 | Tibbs | 206/84 X |

*Primary Examiner*—Travis S. McGehee
*Assistant Examiner*—Horace M. Culver
*Attorney, Agent, or Firm*—Brumbaugh, Graves, Donohue & Raymond

[57] ABSTRACT

As described herein, a reaction carrying gel formation is separated from other reaction carrying gels or a reaction arena gel by a removable impervious barrier. To permit diffusion of the reactant or reactants in either a single or double diffusion reaction, the carrier gels are converted into their sol phases and the barrier is removed from its position between the gels to allow the diffusion reaction to take place.

8 Claims, 3 Drawing Figures

PATENTED APR 23 1974

3,805,475

INVENTOR.
WILLIAM G. GLENN
BY Brumbaugh, Graves,
Donohue & Raymond
his ATTORNEYS.

APPARATUS FOR STORAGE OF INTERACTANTS AND METHOD THEREOF

BACKGROUND OF THE INVENTION

The present invention relates to methods and apparatus for storing reactants, such as antigen, and more particularly, to methods and apparatus for providing storable, preset diffusion configurations with an impervious barrier separating a reaction layer from a reactant.

The precipitin reaction caused by the aggregation of antigens and antibodies has been known since about 1897 and the stabilization of the formed precipitate by incorporating the antigen and antibody was described in the printed literature in about 1905. Since that time, numerous investigators in microbiology and immunology have used precipitation in semi-solid media to explore the differences between bacteria, viruses, protein solutions, conjugated proteins, and various macromolecules that would participate with antibody to form a visible precipitate.

Considerable impetus to studies of protein-protein interaction in gels was given by Jacques Oudin who, in his doctoral dissertation, "L'analyse Immunochimique Expose Critique D'Un Methods; Application Au Serum De Cheval Et Au Lait De Jument," Institute Pasteur (1949), developed the principles of the precipitin reaction and aspects of quantitation, and also set forth certain prerequisites for the successful application of the technique. Although most of Oudin's early work was with these reactions in tubes of various lengths and diameters, he also made preliminary explorations into the incorporation of the reactants in plate configurations (Methods in Medical Research 5: pp. 335–376, New York, The Year Book Publishers (1952)). Subsequent studies of gellified reactions in plate configurations were reported in "Progress in Allergy," pp. 1–77, Karger, Basel, Switzerland (1958).

Since the early 1950's, other medical scientists have published reports on the quantitation of gel reactions in columns (Glenn, W. G., "Quantitative Analyses by Diffusion Column Reactions,": I. "Variations in Diffusion Measurements," J. Immunol. 88: pp. 535–539 (1962); II. "Reproducibility of Analyses Pertinent to the Determination of Reactant Concentrations," Ibid 88: pp. 540–544; III. "Antigen and Antibody Concentration Differences from Diffusion Measurements of Simple Homologous Reactions," Ibid 88: pp. 545–550. It was also proposed to modify the column technique of Oudin by incorporating in 8 cm × 8 mm tubes (1) antiserum in agar at the bottom as a first layer, (2) agar in a middle reaction arena as a second layer, and (3) the antigen under evaluation as the third layer ("Antigenic Analyses by Diffusion," J. Path. & Bact., 65: pp. 49–60 (1953)). In the article entitled, "A Quantitative Study of a Technique of Double Diffusion in Agar," J. Immunol. 77: pp. 52–60 (1956), the use of liquid antiserum as the bottom layer was also suggested.

The tremendous usefulness of the precipitation in gel technique has resulted in its application to many fields of immunology as well as instrumentation. Glenn, W. G., "Serum Agar Measuring Aid," J. Immunol. 77: pp. 189–192 (1956); Glenn, W. G., H. A. Jaeger, and W. E. Prather, "The Biotelescanner: An Instrument for Telemetric Quantitation of Immunodiffusion (Antigen-Antibody) Reactions": Proc. 1st Nat'l. ISA Biomedical Instrumentation Symposium, Los Angeles, Calif., June, 1963; Biomedical Sciences Instrumentation, Vol. 1, Plenum Press, N. Y. (1963); Glenn, W. G. and A. C. Garner, "Integration of Human Serum and Serum Fraction Diffusion Patterns," J. Immunol. 78, No. 6, pp. 395–400 (1957); and Glenn, W. G., U.S. Pat. No. 2,971,431, issued February 14, 1961.

A number of companies at the present time market various configurations of immunodiffusion plates, which are basically modifications of some of the early immunodiffusion plates devised at the turn of the century. These plates are of the single diffusion type and already have antibody incorporated into one area. The user then places a reference antigen or antigens in a prepunched well. Such antigens cannot be preset since when they interface with the antibody during storage, the reaction begins. In addition, the resulting reaction in plates is dependent upon the volume of the antigen. This is subject to considerable variation and is dependent upon the technician's skill and judgment. Thus, there is no uniformity among laboratories in the results for the basic reference antigen or antigens. If diffusion of antigen and antibody (reactants) separately into an intervening area (i.e., double diffusion) in such plates is desired, neither the antigen nor the antibody can be incorporated before the item reaches the user since no provision is usually made for placing an intervening barrier in the gel. Thus, if either the antigen or the antibody is placed next to the arena or area where the reaction will eventually occur, one or both of the reactants will diffuse into the arena during storage. This is undesirable from the standpoint of the user because the analysis will change from one of double diffusion in which both the antigen and the antibody migrate into an intervening reaction arena to one of single diffusion in which either the antigen or antibody migrates into a gellified area already containing one of the other reactants and undergo reaction.

The industry has thus been faced with the problem of preparing a storable, preset single and double diffusion configuration with an impervious boundary between the reactants and the reaction layer. Where such barriers have been provided, the further problem of removing the barrier from between the reactant and the reaction layer is encountered. In a flat plate configuration, the uniformly successful removal of the barrier requires the hand of a highly trained technician.

If single diffusion reactions are made in small tubes, though the volume is not important as in plates, the reference antigen or antigens must be layered onto the antibody-gel by the user. This requires considerable practice to maintain the integrity of the antigen-gellified antibody interface as described below.

If double diffusion reactions are made in small tubes, the conventional procedure is to place antiserum or antigen incorporated in a gel layer in the bottom of the tube as a first layer, place a middle reaction arena of a similar gel directly on the first layer and add a third reactant-carrying gel above the reaction arena. As explained above, this is not a marketable item since the reactant-forming gels are contiguous with the reaction arena, and the reactants will diffuse into the reaction arena during storage.

For convenience, economy, quantitative capability and versatility, gellified reactions performed in holders, such as columns or tubes, are more advantageous than plate holders. However, single and double diffusion reactions in columns, because of the layering of one reactant upon another, require considerable expertise. Here again, the problem is to determine some impervious barrier that can be used to separate the reactants and which could be easily removed to allow a relatively untrained person to initiate the reaction by some simple procedure.

SUMMARY OF THE INVENTION

The applicant has discovered that the solution to the problem resided in the appropriate use of the phenomena of the sol-gel reversibility of substances, such as an agar, agarose, alginate, pectin and polyacrylamide gels, the natural cohesiveness of gels and sols, and the surface tension phenomena of these heteropolysaccharides to a holder surface. According to the invention, a gel of the foregoing type is utilized to carry a reactant, such as antibody, and is inserted into a holder to form a first layer within the holder. In the case of single diffusion a removable impervious layer is then formed, and the reference antigen or antigens incorporated in gel is placed above. For double diffusion, a reaction arena gel formation is then inserted in the holder over the reactant-carrying gel and separated from the gel by a removable impervious barrier. Finally, another barrier is formed over the reaction arena on top of which is the opposing reactant (e.g., antigen incorporated in a gel). To permit diffusion of the reactants into the reaction arena, the carrier gels are converted into the sol stage and the barriers are removed from between the reactants and the reaction arena.

DESCRIPTION OF THE PREFERRED EMBODIMENTS

As used herein, the term "reactant" embraces substances that are true immuno-chemical reactants, as well as substances that may be blended together without the occurrence of a classical chemical reaction. The term "reaction layer" as used herein embraces the antigen-free reaction arena in a double diffusion configuration as well as one of the reactant-containing gels in a single configuration.

Examples of some applications of this invention are in catalytic reactions in chemistry, in the separation of petroleum products and additives, in the analyses of colloidal protoplasmic structures before and after gelation and solation, in the storage of vaccines and their adjuvants, in the storage of cosmetics and lotions which are to be later mixed, and in the storage of pharmaceutical solutions. The present invention is particularly directed to the storage of gel formations containing antigen and antibodies which are commonly assayed in human and animal serum, bacteria and viral extracts, pollen extracts, plant extracts, parasites and biological macromolecules.

Figure 1:
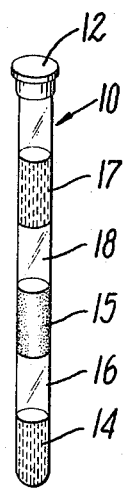
FIG. 1 is a perspective view showing the orientation of stored reactant-carrying gels in a double diffusion configuration separated from a reaction arena gel formation by removable impervious barriers arranged according to the present invention.
Figure 2:
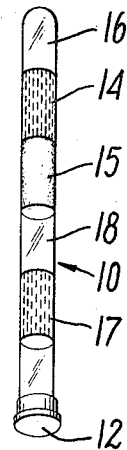
FIG. 2 is a view similar to FIG. 1 showing the orientation of the gels and the reaction arena with one of the impervious barriers removed from between a gel and the reaction arena.
Figure 3:
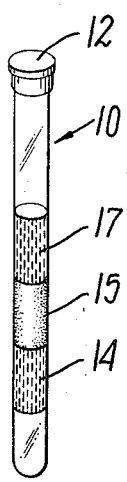
FIG. 3 is a view similar to FIGS. 1 and 2 showing the final orientation of the gels and the reaction arena with both impervious barriers removed from between the gels and the reaction arena.

In a preferred embodiment of apparatus for storing a reactant carried by a gel formation, as shown in FIGS. 1-3, there is provided a transparent tubular member 10, preferably formed of glass, having its open end enclosed by a gas and liquid impervious cap member 12. By way of example, the tubular member may be 60 mm long and have a 4 mm outside diameter and a 2 mm inside diameter. Depending upon the method employed to analyze the diffusion of the reactants stored in the member 10, the member may be formed of either a highly light transmissive material, e.g., for optical scanning, or an opaque material, as will be understood.

The applicant's invention resides in the appropriate use of phenomena of sol-gel reversibility of agarose and similar material and the balancing of this phenomena with the natural cohesiveness of gels and sols and the surface tension of these heteropolysaccharides to the tubular member 10. The process of inserting gels and reactant-carrying gels into the member 10 and separating the gels by liquid impervious barriers, such as air bubbles, for storage can then be rather easily implemented, as will be described hereinbelow.

Inserted into the tube after removal of cap 12 by means of a syringe (not shown) and forming a first layer is a gel 14 having a reactant, such as antibody, incorporated therein. As noted above, the gel used in the instant invention possesses a sol-gel reversibility characteristic and may be a gel such as agar, agarose, alginate, pectin or a polyacrylamide gel. A gel 15 constituting the reaction arena is stored above the reactant-carrying gel 14 and separated therefrom by a removable impervious barrier 16, such as air. Superposed over the reaction arena 15 is a reactant- (antigen) carrying gel 17. Again, the reactant-carrying gel 17 is separated from the reaction arena 15 by a removable impervious barrier 18, such as air.

If a single diffusion configuration is desired, cap 12 is removed and the antibody-containing gel is introduced. After gelation at 25°C. for about 10 minutes, an air bubble is formed over which antigen-containing gel is introduced.

The appropriate insertion of the gels 14, 15 and 17 in their sol phases through the cap member 12 may be accomplished by means of a blunted No. 15 through No. 19 needle of about 100 mm length attached to a 1 to 10 ml glass syringe. The syringe and needle are warmed to about 55°C.–60°C. before layering the agar or agarose reaction arena 15 and the antibody and antigen-containing layers 14 and 17, respectively. Where there is a balance between the phenomena of sol-gel reversibility and the surface tension of the described gels in the process of inserting the layers 14 and arena 15 into the tube 10 in superposed relation, air bubbles 16 and 18 form to isolate the reaction arena 15 from the layers 14 and 17. Agarose is usually preferred as the carrier gel and the reaction gel because precipitation of interfering ions or radicals is reduced to a minimum.

The layers 14 and 17 and arena 15 are gelled when subjected to a cooling medium maintained at about 25°C. for about 15 minutes. When gellified, the layers 14 and 17 and arena 15 are and remain stable for shipping or storage. The concentrations of agarose or agar, the pH and temperature conditions, and the needle size used to form layers 14 and 17 and arena 15 are important. Experiments have indicated that air bubbles 16 and 18 will not be formed with consistency when needles of greater or lesser diameter than that of a No. 15–No. 19 size needle are used. In addition, a 0.25% to 1.5% by weight agar or agarose reaction arena 15, a 0.10% to 0.25% by weight agar or agarose layer 17, and a 0.25% to 0.50% by weight agar or agarose layer 14 have the proper sol-gel cohesiveness characteristics to insure a stable gel formation and a consistency in the formation of air bubbles 16 and 18. Concentrations of 0.25% for arena 15, 0.125% for layer 17 and 0.50% for layer 14 have given an agarose gradient which stacks well. The use of the lower agarose concentration in the reaction arena facilitates the diffusion of the reactants into this arena as compared to the diffusion observed if higher concentrations are used. Refrigeration at about 4°C. for about 48 hours insures good gelation.

To start the diffusion of layers 14 and 17 into the reaction arena 15, cap 12 is removed and arena 15 and layer 17 are simultaneously caused to sol, such as by placing the end of the tube in a water bath heated to about 60°C. for about 8 to 10 minutes, and are gently tapped to move the layers 14 and 17 in contact with arena 15.

If desired, each of the layers 14 and 17 can be converted to their sol stages in two steps by heating with a gentle tapping of the tube being performed after solation of each layer to move it into contact with the reaction arena 15.

In connection first with the removal of the air bubble 16 from its position between the reactant-carrying gel 14 and the reaction arena 15, the lower end of the tube 10 is heated, as above described, to convert the gel 14 into its sol phase. The tube 10 is then inverted and gently agitated, as by tapping, to move the air bubble 16 upwardly through the sol 14, which, in turn, flows downwardly to a location next to the reaction arena 15, as shown in FIG. 2. The sol 14 is then allowed to gel. The tube is then restored to its upright position, the gel 17 is converted to its sol phase, agitated to cause its downward flow to a location adjacent the reaction arena 15 and then gellified. The final orientation of the gels 14 and 17 with the reaction arena 15 is shown in FIG. 3.

If desired, a more simplified procedure can be employed to bring either layer 14 or 17 into contact with the reaction arena 15. For example, when the gels are at about room temperature if one end of the tube 10 is held in the palm of the hand and then shaken like a clinical thermometer, it is possible to force the reactant-carrying gel at the other end of the tube 10 downwardly into a position contiguous with the reaction layer 15. Of course, this procedure can also be accomplished by centrifugation by machine.

When a single diffusion configuration is used, only one layer need be repositioned. Solation of this layer for 15 minutes at 50° C. with the cap 12 removed and shaking like a clinical thermometer positions the two layers together.

Alternatively, the apparatus of the present invention can be prepared in columns initially opened at both ends. The reaction layer 14 can then be made by dipping the holder tube 10 into an antigen or antibody-agarose sol. Capillary action forces some of the agarose sol into the tube which then forms the layer 14. A cap is then placed over this open end to retain the layer 14 within the tube 10. Subsequently, all other layers are made as described above for tubes initially closed on one end.

For the analysis of unknown animal or human macromolecules that will precipitate with an antibody, the apparatus of the present invention may be used with a calibrated reference antigen, or antibody, or a combination of both incorporated in the lowest layer 14 and separated from the reaction arena 15 by an air bubble 16. The user will sol layer 14 and then force its movement into a position adjacent the reaction arena 15. The particular sample is then placed above and in contact with the reaction arena 15.

In the apparatus and method of the present invention, the attenuation of the reactants is negligible since diffusion is two-dimensional, sensitivity of the assay is increased, and temperature control during incubation is easy to accomplish by inserting the tubes in a water bath. The invention provides a means for safely storing reactants in a single holder without danger of their premature interaction and allows a relatively unskilled technician to initiate the desired reaction.

In the manner described above, calibrated antigens and/or antibodies may be pre-packaged for quantitative reference standards and immunodiffusion will not start until the reactants are located next to the reaction layer. The apparatus of the present invention allows all testing laboratories to be assured that with a pre-packaged reference standard from the same source and batch, all have the same quantitative baseline. This baseline can be used to qualitatively and/or quantitatively assay antigens or antibodies in human serum, animal serum, bacteria and viral extracts, pollen extracts, plant extracts, parasites and biological macromolecules. No such standardization exists for immunodiffusion analyses at present.

Although the invention has been described herein with references to a specific embodiment, many modifications and variations therein will readily be apparent to those skilled in the art. Accordingly, all such variations and modifications are included within the intended scope of the invention as defined by the following claims.

I claim:

1. In apparatus for providing a storable preset diffusion configuration having a reaction layer formed of a gel and two reactant-carrying gels possessing a sol-gel reversibility characteristic, the improvement comprising a removable gas barrier interposed between the reaction layer and an antibody-carrying gel, said gas barrier being responsive to agitation for movement outside its interpositional location between the reaction layer and the antibody-carrying gel, and a second gas barrier formed on the opposite side of the reaction layer from the first gas barrier and interposed between a second antigen-carrying gel and said reaction layer, said antigen being the complementary antigen to the antibody.

2. In apparatus for providing a storable preset diffusion configuration having a reaction layer formed of a gel and at least one reactant-carrying gel possessing a sol-gel reversibility characteristic, the improvment comprising a removable gas barrier interposed between the reaction layer and the reactant-carrying gel, said gels being selected from the group consisting of agar, agarose, alginate, pectin and polyacrylamide gels.

3. In apparatus for providing a storable preset diffusion configuration having a reaction layer formed of a gel and two reactant-carrying gels possessing a sol-gel reversibility characteristic, the improvement comprising removable gas barriers interposed between the reaction layer and the two reactant-carrying gels, said reactant-carrying gels comprising about 0.125% and 0.50% by weight, respectively, of a substance selected from the group consisting of agar and agarose.

4. In apparatus for providing a storable preset diffusion configuration having a reaction layer formed of a gel and at least one reactant-carrying gel possessing a sol-gel reversibility characteristic, the improvement comprising a removable gas barrier interposed between the reaction layer and the reactant-carrying gel, said gel forming the reaction layer comprising about 0.25% by weight of a substance selected from the group consisting of agar and agarose.

5. In apparatus for providing a storable preset diffusion configuration having a reaction layer formed of a gel and two reactant-carrying gels possessing a sol-gel reversibility characteristic, the improvement comprising a removable gas barrier interposed between the reaction layer and an antibody-carrying gel, said gas barrier being responsive to agitation for movement outside its interpositional location between the reaction layer and the antibody-carrying gel and a second gas barrier formed on the opposite side of the reaction layer from the first gas barrier and interposed between a second antigen-carrying gel and said reaction layer, said two reactants being an antibody and an antigen and each being contained in a gel comprising about 0.125% and 0.50% by weight of a substance selected from the group consisting of agar and agarose, respectively, and the reaction layer gel formation comprising about 0.25% by weight of a substance selected from the group consisting of agar and agarose.

6. In a method for storing in a holder a reactant carried by a gel formation having a sol-gel reversibility characteristic, the improvement comprising positioning a reactant-carrying gel formation and a reaction layer gel formation within the holder and locating a gas between the reactant-carrying gel and the reaction layer, the gels being first positioned in the holder as a sol and being cooled to form a gel, said sols being inserted into the tube by a No. 15 to No. 19 needle attached to a syringe.

7. In a method for storing in a holder a reactant carried by a gel formation having a sol-gel reversibility characteristic, the improvement comprising positioning a reactant-carrying gel formation and a reaction layer gel formation within the holder and locating a gas between the reactant-carrying gel and the reaction layer, the gels being first positioned in the holder as a sol and being cooled to form a gel, said sols being heated to about 55° C. to 60° C. before insertion into the holder.

8. In a method for storing in a holder a reactant carried by a gel formation having a sol-gel reversibility characteristic, the improvement comprising positioning a reactant-carrying gel formation and a reaction layer gel formation within the holder and locating a gas between the reactant-carrying gel and the reaction layer, the gels being first positioned in the holder as a sol and being cooled to form a gel, the said cooling being at a temperature of about 25° C.

* * * * *